(12) United States Patent
Heukensfeldt Jansen et al.

(10) Patent No.: US 8,884,235 B2
(45) Date of Patent: Nov. 11, 2014

(54) SYSTEM AND METHOD FOR COLLIMATION IN DIAGNOSTIC IMAGING SYSTEMS

(71) Applicant: General Electric Company, Schenectady, NY (US)

(72) Inventors: Floribertus P. M. Heukensfeldt Jansen, Ballston Lake, NY (US); Yaron Hefetz, Kibbutz Alonim (IL)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/083,801

(22) Filed: Nov. 19, 2013

(65) Prior Publication Data

US 2014/0075734 A1    Mar. 20, 2014

Related U.S. Application Data

(62) Division of application No. 13/149,417, filed on May 31, 2011.

(51) Int. Cl.
| | | |
|---|---|---|
| *G21K 1/02* | (2006.01) | |
| *G21K 1/04* | (2006.01) | |
| *G02B 27/30* | (2006.01) | |

(52) U.S. Cl.
CPC *G21K 1/02* (2013.01); *G21K 1/025* (2013.01); *G02B 27/30* (2013.01)
USPC ........ 250/363.1; 378/147; 378/148; 378/149; 378/150

(58) Field of Classification Search
CPC ............. G21K 1/00; G21K 1/02; G21K 1/04; G21K 1/046; G01N 2201/0633; G01N 2223/316; G01N 2201/0813

USPC ................................ 378/147–150; 250/363.1
See application file for complete search history.

(56) References Cited

U.S. PATENT DOCUMENTS

| | | | | | |
|---|---|---|---|---|---|
| 3,543,384 | A | * | 12/1970 | Hansen | 82/47 |
| 4,196,351 | A | * | 4/1980 | Albert | 378/98.6 |
| 4,197,460 | A | * | 4/1980 | Anger | 250/363.02 |
| 4,250,392 | A | * | 2/1981 | Leask et al. | 250/505.1 |
| 4,859,852 | A | | 8/1989 | Genna et al. | |
| 6,324,258 | B1 | | 11/2001 | Beekman | |

(Continued)

OTHER PUBLICATIONS

Ahmed et al., "A Fan-Beam Collimator Design for Small Animal Scintigraphy", Medical Physics, vol. 37, Issue 7, Jul. 2010, p. 3901.

(Continued)

*Primary Examiner* — David Porta
*Assistant Examiner* — Jeremy S Valentiner
(74) *Attorney, Agent, or Firm* — Melissa K. Dobson

(57) ABSTRACT

A system and method for collimation in diagnostic imaging systems is provided. One collimator includes a plurality of parallel hole segments and a plurality of collimator bores within each of the plurality of parallel hole segments. Additionally, all of the plurality of collimator bores in at least one of the plurality of parallel hole segments have a first pointing direction and all of the plurality of collimator bores in at least one other of the plurality of parallel hole segments have a second pointing direction, wherein the plurality of parallel hole segments are arranged in a fanbeam collimation configuration. Further, the first pointing direction is different than the second pointing direction.

5 Claims, 8 Drawing Sheets

(56) References Cited

U.S. PATENT DOCUMENTS

| | | |
|---|---|---|
| 6,760,404 B2 | 7/2004 | Saito et al. |
| 7,356,125 B2 | 4/2008 | Vogtmeier et al. |
| 2004/0034269 A1* | 2/2004 | Ozaki ............................ 600/1 |
| 2004/0159791 A1 | 8/2004 | Hefetz |
| 2005/0078798 A1* | 4/2005 | Jiang ............................ 378/147 |
| 2006/0256915 A1* | 11/2006 | Otto et al. ..................... 378/65 |
| 2008/0029704 A1 | 2/2008 | Hefetz et al. |
| 2008/0237482 A1 | 10/2008 | Shahar et al. |
| 2009/0108206 A1 | 4/2009 | Breuer et al. |
| 2011/0204242 A1 | 8/2011 | Hoch et al. |
| 2012/0039446 A1 | 2/2012 | Cui et al. |
| 2012/0108948 A1 | 5/2012 | Jansen et al. |

OTHER PUBLICATIONS

Chi Liu, "Mycocardinal pefusion SPECT Using A Rotating Multi-Segment Slant-Hole Collimator", Medical Physics, vol. 37, Issue 4, Apr. 2010, pp. 1610-1618.

* cited by examiner

CROSS SECTION A-A

CROSS SECTION A-A

SYSTEM AND METHOD FOR COLLIMATION IN DIAGNOSTIC IMAGING SYSTEMS

CROSS REFERENCE TO RELATED APPLICATIONS

This application is a divisional of U.S. Non-provisional patent application Ser. No. 13/149,417, entitled "System and Method for Collimation in Diagnostic Imaging Systems", filed May, 31, 2011, which is incorporated herein and by reference.

BACKGROUND

The subject matter disclosed herein relates generally to diagnostic imaging systems, and more particularly to detector collimation in Nuclear Medicine (NM) imaging systems.

In NM imaging, radiopharmaceuticals are taken internally and then detectors (e.g., gamma cameras), typically mounted on a gantry, capture and form images from the radiation emitted by the radiopharmaceuticals. The NM images primarily show physiological function of, for example, a patient or a portion of a patient being imaged.

Collimation may be used to focus the field of view of the detectors. For example, parallel hole collimators may be used. Additionally, converging fanbeam collimators can be used to improve the sensitivity of the detectors over a limited field of view. However, current fanbeam collimators are constructed using a precision cast process that is difficult to perform and expensive. The precise construction is needed because image quality depends on the alignment of tens of thousands of collimator bores that point in slightly different directions. Additionally, because every collimator bore points in a unique direction, reconstruction algorithms that use certain rebinning techniques may cause loss of resolution.

BRIEF DESCRIPTION

In accordance with an embodiment, a collimator for a radiation imaging detector is provided that includes a plurality of parallel hole segments and a plurality of collimator bores within each of the plurality of parallel hole segments. Additionally, all of the plurality of collimator bores in at least one of the plurality of parallel hole segments have a first pointing direction and all of the plurality of collimator bores in at least one other of the plurality of parallel hole segments have a second pointing direction. Further, the first pointing direction is different than the second pointing direction, such that the plurality of parallel hole segments are arranged in a fanbeam collimation configuration.

In accordance with another embodiment, a nuclear medicine (NM) imaging system is provided that includes a gantry and at least one imaging detector supported on the gantry and configured to rotate about the gantry defining an axis of rotation. The NM imaging system also includes a collimator coupled to the at least one imaging detector, with the collimator having a plurality of parallel hole segments. A plurality of collimator bores are within each of the plurality of parallel hole segments, with all of the plurality of collimator bores in at least one of the plurality of parallel hole segments having a first pointing direction and all of the plurality of collimator bores in at least one other of the plurality of parallel hole segments having a second pointing direction. Additionally, the first pointing direction is different than the second pointing direction, such that the plurality of parallel hole segments are arranged in a fanbeam collimation configuration.

In accordance with yet another embodiment, a method for manufacturing a collimator of an imaging system is provided. The method includes coupling tubes together to form a stack of parallel hole collimator segments or forming a corrugated collimator core, and cutting the stack or the corrugated collimator core at one or more pointing directions to form a plurality of slanted collimator segments. The method also includes coupling the plurality of the slanted collimator segments together to form a segmented type collimator, wherein at least two of the slanted collimator segments have collimator bores with different pointing directions and are arranged in a fanbeam collimation configuration.

DETAILED DESCRIPTION

Figure 1:
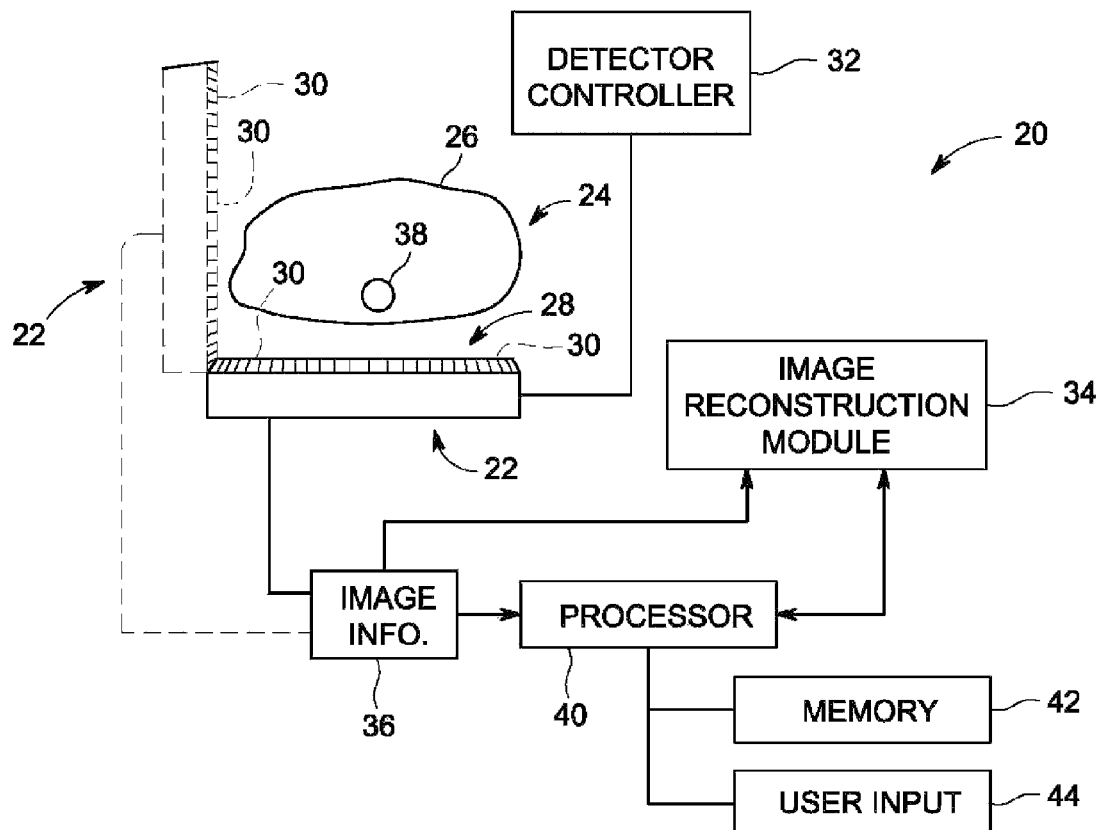
FIG. 1 is a schematic block diagram illustrating a Nuclear Medicine (NM) imaging system formed in accordance with various embodiments.

The foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide a system and method for collimation in diagnostic imaging systems, such as a Nuclear Medicine (NM) imaging system. For example, a collimator arrangement may be provided for use in a Single Photon Emission Computed Tomography (SPECT) imaging system. The collimator arrangement in various embodiments is formed from sections of parallel hole collimators, such that a fanbeam collimator is approximated. By practicing at least one embodiment, one technical effect is reduced cost and reduced complexity for precision collimator manufacturing. Additionally, at least one other technical effect is the ability to use a simpler reconstruction algorithm.

Some embodiments provide a segmented collimator that includes slanted parallel hole collimator segments. The segmented collimator provides fanbeam type collimation, such as for use with detectors of an NM imaging system, for example, a SPECT system. An NM imaging system 20 may be provided as illustrated in FIG. 1 having an NM camera configured as a SPECT detector 22. It should be noted that the various embodiments are not limited to the NM imaging system 20 having a single detector 22 operable to perform SPECT imaging. For example, the NM imaging system 20 optionally may include one or more additional detectors 22 (an additional detector 22 is illustrated in dashed lines) such that a pair of detectors 22 is provided having a central opening 24 therethrough. An object, such as a patient 26, is positioned in proximity to the one or more detectors 22 for imaging.

It should be noted that number of detectors 22 may be greater than two, for example three or more. In a multi-detector camera, the position of the detectors 22 may be substantially at 90 degrees to each other as illustrated in FIG. 1, or in different configurations as known in the art. It also should be noted that in a multi-detector camera configuration, some of the collimators may optionally be a standard collimator, for example a parallel hole collimator or a standard fan-beam collimator, or a cone-beam collimator, or a pinhole collimator, while at least one of the collimators is a segmented collimator according to one or more of the various embodiments. Alternatively, all of the collimators may be segmented collimators according to one or more of the various embodiments.

The detectors 22 may be pixelated detectors that may operate, for example, in an event counting mode. The pixelated detectors 22 may be configured to acquire SPECT image data. The detectors 22 may be formed from different materials, particularly semiconductor materials, such as cadmium zinc telluride (CdZnTe), often referred to as CZT, cadmium telluride (CdTe), and silicon (Si), among others. In some embodiments, a plurality of detector modules is provided, each having a plurality of pixels. In other embodiments, the detector 22 may be made of a scintillation crystal such as NaI coupled to an array of Photo-Multiplier Tubes (PMTs). However, it should be noted that the various embodiments are not limited to a particular type or configuration of detectors, and any suitable imaging detector may be used.

The detectors 22 are fitted with (e.g., have coupled thereto) collimators 28 that include a plurality segments 30, which in various embodiments are parallel hole collimator segments, at least some of which are slanted parallel hole collimator segments. For example, four segments 30 are illustrated that define four different parallel hole collimator sections where the pointing direction of the bores within at least some of the individual segment 30 are different. However, some of the segments 30 may have bores that are pointed the same. Accordingly, while one or more the segments 30 may have bores provided at the same pointing direction, at least one segment 30 has bores at a different pointing direction than the bores of another segment 30, which may be adjacent or non-adjacent segments 30, as described in more detail herein.

It should be noted as used herein, pointing direction refers to one or more angles that define a direction that the bore extends through the collimator 28. For example, the pointing direction defines a tilt direction in various embodiments that may be defined by an azimuth and elevation. In various embodiments, the tilt is defined by two angles, such as an axial angle and a transaxial angle. Thus, the pointing direction may be a pointing vector that is not normal to a face of the collimator 28.

The detectors 22 may be provided in different configurations, for example, in single planar imaging mode (illustrated in FIG. 1), a two detector 22 "L" mode configuration (illustrated in FIG. 1 with the dashed line detector 22), an "H" mode configuration, or a three headed camera, among others. Additionally, a gantry (not shown) supporting the detectors 22 may be configured in different shapes, for example, as a "C" and the detectors 22 may be arranged in different configurations.

The imaging system 20 also includes a detector controller 32 that operates to control the movement of the detectors 22 around the central opening 24 and about the patient 26. For example, the detector controller 32 may control movement of the detectors 22, such as to rotate the detectors 22 around a patient, and which may also include moving the detectors closer or farther from the patient 26 and pivoting the entire detector 22.

The imaging system 20 also includes an image reconstruction module 34 configured to generate images from acquired image information 36 received from the detectors 22. For example, the image reconstruction module 34 may operate using NM image reconstruction techniques, such as SPECT image reconstruction techniques to generate SPECT images of the patient 26, which may include an object of interest, such as the heart 38 of the patient. As described in more detail herein, in one embodiment, with the pointing directions of the segments 30 at projection pointing direction steps (e.g. gantry rotation steps) of the imaging system 20, the image information 36 can be rebinned into parallel projections without a loss of resolution.

Variations and modifications to the various embodiments are contemplated. For example, in a dual headed system, namely one with two detectors 22, one detector 22 may include the collimator 28 with the segments 30 while the other detector 22 includes a parallel hole collimator. In this embodiment, the parallel hole collimator can obtain information for an entire field of view (FOV), while the detector 22 with the collimator 28 operates to focus on a smaller region of interest (ROI) to provide higher quality information (e.g., more accurate photon counting). Accordingly, the collimator 28 with the segments 30 provides fanbeam or converging type of operation.

The image reconstruction module 34 may be implemented in connection with or on a processor 40 (e.g., workstation) that is coupled to the imaging system 20. Optionally, the image reconstruction module 34 may be implemented as a module or device that is coupled to or installed in the processor 40. Accordingly, the image reconstruction module 34 may be implemented in software, hardware or a combination thereof. In one embodiment, the image reconstruction may be performed on a remote workstation (e.g., a viewing and processing terminal) having the processing components and not at the imaging scanner.

It should be noted that in various embodiments, the image reconstruction (e.g., generating a 3D image from a plurality of acquired 2D projections) is performed using one or more iterative algorithms (e.g., a maximum-likelihood expectation maximization (MLEM) algorithm or an ordered-subset expectation maximization (OSEM) algorithm or other suitable algorithm) taking into account the known tilts of the various sections of the collimator 28. Specifically, when axial tilt is involved, direct (non-iterative) reconstruction algorithms such as filtered back projection (FBP) may not be used.

The image information 36 received by the processor 40 may be stored for a short term (e.g., during processing) or for a long term (e.g., for later offline retrieval) in a memory 42. The memory 42 may be any type of data storage device, which may also store databases of information. The memory 42 may be separate from or form part of the processor 40. A user input 44, which may include a user interface selection device, such as a computer mouse, trackball and/or keyboard is also provided to receive a user input.

Thus, during operation, the output from the detectors 22, which may include the image information 36, such as projection data from a plurality of detector or gantry angles is transmitted to the processor 40 and the image reconstruction module 34 for reconstruction and formation of one or more images.

Figure 2:
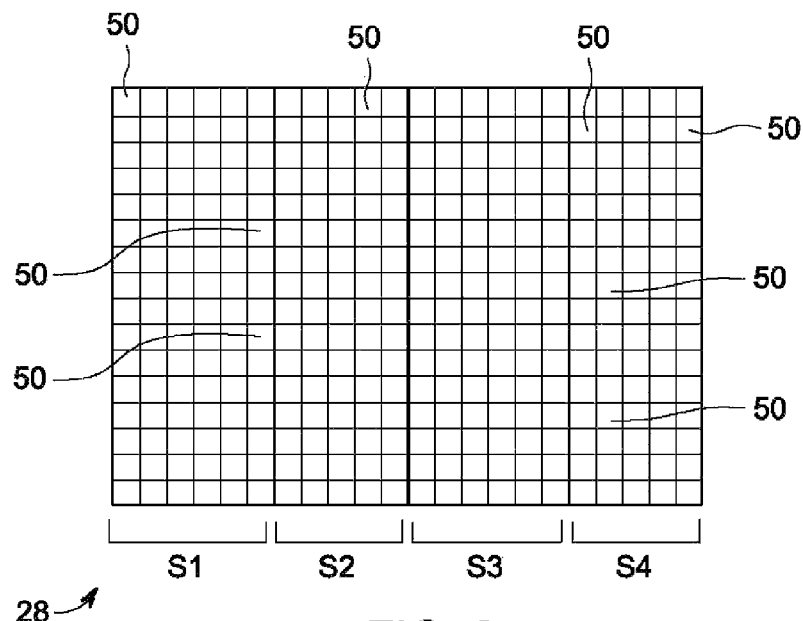
FIG. 2 is a diagram of a collimator formed in accordance with various embodiments.

As illustrated in FIG. 2, the collimator 28 may include four segments 30 ($S_1$-$S_4$), with each having a plurality of collimator bores 50. It should be noted that the bores 50 may include, for example, any shape or size of hole or opening. The pointing direction of the bores 50 in each of the segments 30 may be different, such as pointed for focusing on an ROI. However, two or more of the segments 30 may have parallel bores 50 pointed inwardly (toward the middle of the detector 22) to the same degree. For example, segments $S_1$ and $S_4$ may have bores 50 pointed the same while the bores 50 of segments $S_2$ and $S_3$ are pointed the same, such as +/−10 degrees and +/−20 degrees, respectively. Thus, the bores 50 for each of the segments 30 are pointed the same, but the pointing direction is different for at least two of the segments 30, to define different projection pointing directions in the different segments 30. Thus, the segments 30 define fixed slanted parallel hole collimator sections which together can provide fanbeam type operation, for example, approximate fanbeam collimation.

However, the bores 50 may be pointed at different angles than as described herein, for example, as desired or needed. For example, the pointing direction may define an angle relative to a face of the collimator 28 of between about 30 degrees and about 45 degrees. In one embodiment, such as in a five segment 30 collimator 28, the segments may have pointing directions with the following angle degrees: −40, −20, 0, +20, +40. For example, for a 3×5 array of segments 30, for a 40×50 cm detector 22 may have the following angulations:

[(−40,−30),(−20,−30), (0,−30), (+20,−30) (+40, −30)];
[(−40,0),(−20,0), (0,0), (+20,0) (+40, 0)]; and
[(−40,+30),(−20,+30), (0,+30), (+20,+30) (+40, +30)].

Thus, the tilt of a peripheral section can be less than about 30 degrees and more than about 45 degrees such that the focal point (or line) is near the center of the body or ROI. This may be optimized to the particular application. In a small body part, such as a brain, the focal point may be set to the center of the brain, for example, which is about 15 cm deep. With a 50 cm detector width, the angle is more than 45 degrees.

It should be noted that the rectangular shape of the bores 50 in FIG. 2 is for illustration only, and other shapes, for example hexagonal or round collimator bores may be used. Additionally, it should be noted that the segments 30 need not be shaped as strips and may be arranged in a two-dimensional configuration. For example, a 3×3 array of 9 segments 30 may be used. Further, some segments 30 may be wedge shaped, have a curved outline, or may be provided in different shapes.

It should be noted that the segments 30 and bores 50 may be formed from any suitable collimator material, for example, lead or tungsten. It also should be noted that different segments 30 may be formed having different parameters such as bore size, shape, angulations and length.

Thus, in the various embodiments, the bores 50 are generally parallel bores 50, namely openings through the collimator 28, such that the plurality of parallel hole segments 30 form a fanbeam type arrangement, which may have different focal lengths. In one embodiment, the bores 50 in each segment have a different degree of slanting. However, the bores 50 in one or more segments 30 or may be perpendicular to the surface of the detector 22. For example, in one or more segments 30, the bores 50 may be slanted such that the bores 50 are pre-focused to a typical point of offset based on the location of the segment 30 along the collimator 28. Thus, the collimator 28 formed in accordance with various embodiments may have different configurations.

Modifications and variations are contemplated to the various embodiments. For example, each of the segments 30 may have different sizes of bores 50 or different bore lengths. In some embodiments, the bores 50 that are usually further from the ROI (near the edge of the detector 22) may be longer bores to compensate for the greater distance to the ROI (at the expense of sensitivity, but maintaining some resolution). In other embodiments, the segments 30 may be incrementally converging or diverging along the axis of rotation of the imaging system 20 (shown in FIG. 1), which effectively reduces or increases, respectively, the FOV in the direction along the axis of rotation and increases the sensitivity. When the FOV is known to be quite small (e.g., in the heart) this additional convergence in each of the respective segments 30 can provide additional improvement in sensitivity. In still other embodiments, the bores 50 in each of the segments 30 may be pointed different from one segment 30 to another along the short or long axis of the segment 30.

Figure 3:
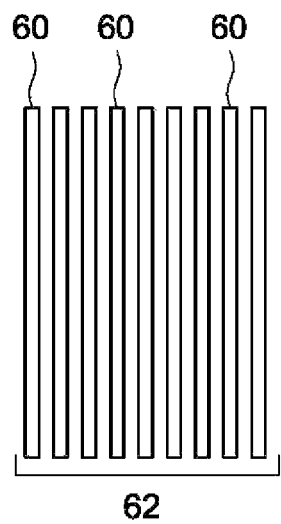
FIG. 3 is a diagram illustrating tubes used to form a collimator in accordance with various embodiments.

The collimator 28 in various embodiments is a single collimator unit defining a single collimator body formed from several segments 30. For example, the collimator 28 is constructed from several segments 30 of parallel hole collimator sections that are coupled together to form the single collimator 28. Accordingly, once the segments 30 are coupled together, the segments 30 move together as a single unit (and also move with the detectors 22 when coupled thereto). In one embodiment, the segments 30 are formed from lead tubes 60 (also referred to as lead straws) as shown in FIG. 3, which may be tubes 60 of lead stacked in parallel and then coupled together, such as with epoxy or other suitable glue. The lead tubes 60 may have one or more channels or bores therethrough. In one embodiment, the segments 30 are cut out of stack of lead straw, which are formed using any suitable method for constructing a single parallel hole collimator. The tubes 60 may have bores with different cross-sectional shapes, such as circular, square or hexagonal, among others.

Figure 4:
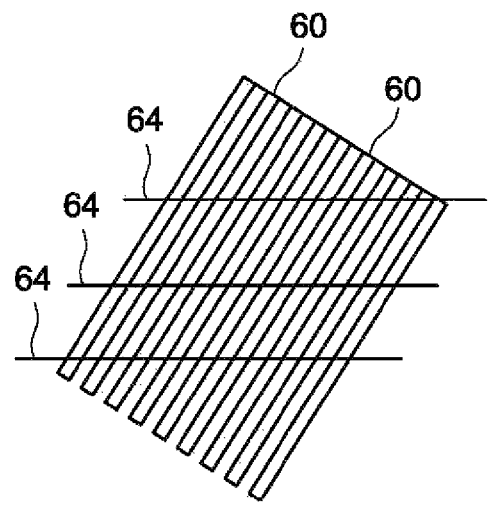
FIG. 4 is a diagram illustrating the cutting of stacks of tubes to form slanted parallel hole collimator segments in accordance with various embodiments.
Figure 5:
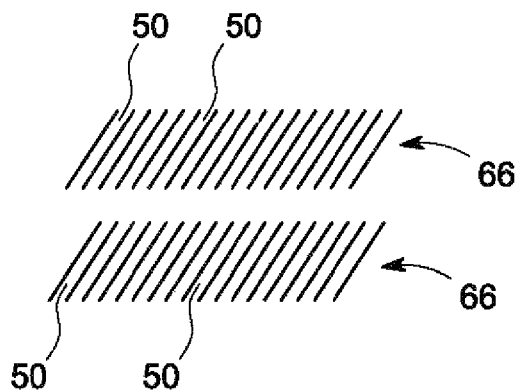
FIG. 5 is a diagram of slanted parallel hole collimator segments formed in accordance with various embodiments.
Figure 6:
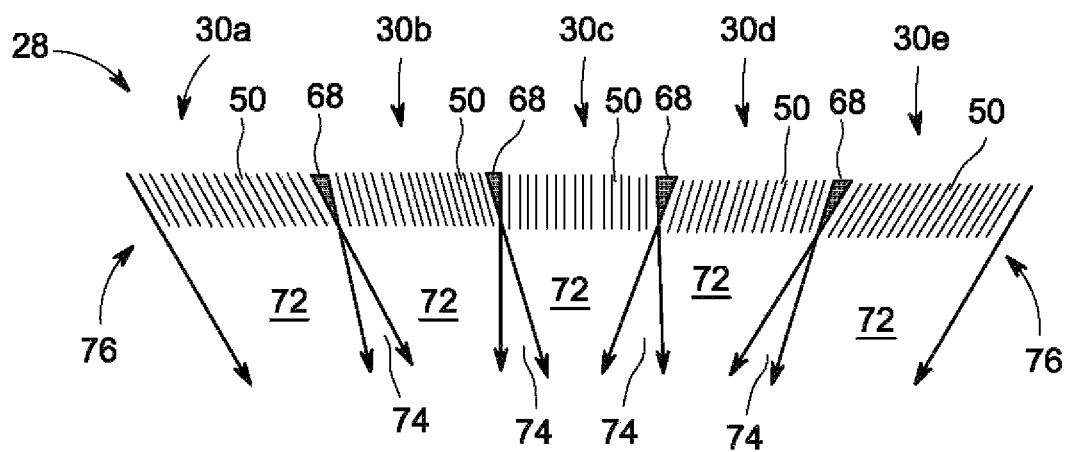
FIG. 6 is a diagram of a collimator formed in accordance with various embodiments.

With the lead tubes 60 coupled together into a stack 62, pointed parallel hole segments 30 are formed. In particular, the stack 62 of lead tubes 60 is cut at one or more pointing directions as illustrated by the cut lines 64 in FIG. 4. Alternatively, a thick collimator may be formed as described below. It should be noted that the pointing direction of the cuts to form the parallel hole segments 30 may be varied as desired as needed, such as based on the particular pointing direction for one or more segments 30. The cutting and finishing of the segments 30 from the stack 62 of lead tubes 60 is performed using any suitable collimator cutting technique, such as any suitable parallel hole collimator cutting technique. The cutting of the stack 62 of lead tubes 60 results in a series of slanted parallel hole collimator sections 66 having parallel bores 50 as shown in FIG. 5 and that define the segments 30 as shown in FIG. 6. It should be noted that while the parallel hole collimator sections 66 are shown as having constant thickness, wedge like sections (or other configurations) may be provided by cutting along non-parallel cut lines, thereby resulting in sections 66 with variable bore length. The cutting may be performed, for example, using a wire saw, which allows for curved cut lines to be made.

The segments 30 are joined together using any suitable coupling means, such as with epoxy or other suitable glue, to form the collimator 28. As can be seen, each of the segments 30 has bores 50 within that segment 30 pointed to the same degree, with the bores 50 in at least two segments 30 pointed differently. It should be noted that one or more segments 30 may have non-slanted bores 50 as illustrated by the segment 30c. Additionally, in this embodiment, the bores 50 in segments 30a and 30e are pointed inwardly at the same slant of the pointing direction and the bores 50 in segments 30b and 30d are pointed inwardly at the same pointing direction. However, as should be appreciated, the pointing directions for the set of bores 50 in each segment 30 may be different.

It should be noted that the formation or construction of the collimator 28 may be provided using any suitable method. For example, the collimator 28 may be formed by a method for forming corrugated collimators, such as described in U.S. Pat. No. 3,936,340 entitled "Method for Making Corrugated Collimators for Radiation Imaging Devices." However, it should be appreciated that there are variations to the described method. As another example, the collimator 28 may be formed using a tube assembly process. It should be noted that the process described below is described generally for forming a single segment and when forming a multi-segment collimator different steps may be used as further described. The process, in one embodiment, includes:

a. Forming a plurality of lead tubes, for example, about 20 cm long, about 2 mm bore diameter, about 0.2 mm wall, and having a hexagonal cross-section. However, other dimensions and parameters may be used, as well as other cross-sectional shapes, such as square cross-sections were made. In one embodiment, a high pressure punch is used.

b. Applying glue on the outer surface of the lead tubes.

c. Stacking the tubes (e.g., in a frame to maintain parallelism and shape) and curing the glue forming a thick "honeycomb" structure. It should be noted that the stacking may be performed while tubes are on a wedge, thereby creating a structure similar to FIG. 5.

d. Filling the bores with wax to provide rigidity.

e. Sawing or cutting the structure to create "collimator cores" (e.g., 10 cores of 2 cm bore length). For a multi-segment collimator, a plurality of sections is cut with desired angulations (namely, the collimator core is cut to slanted segments).

f. Mounting each core in a collimator holder. For a multi-segment collimator, a set of segments are mounted/positioned on the holder based on desired angulations or pointing directions. It should be noted that optionally different segments may be separately cut.

g. Removing the wax (e.g., by heat and/or solvent). It should be noted that steps f and g may be reversed in some embodiments.

Variations are also contemplated. For example, for a corrugated collimator, a thick or tilted corrugated collimator core is formed or prepared, and then step d through g are performed as described above.

Thus, using segments 30 having parallel bores 50 to form the collimator 28, a fan beam type collimation arrangement is provided. It should be noted that shielding also may be provided in the region or gap between the collimator segments 30 (or behind the segments) to reduce or prevent high count rates caused by radiation penetrating through the gap between adjacent segments 30. As illustrated in FIG. 6, a wedge shaped shielding member 68 may be provided between adjacent segments 30 that fills the gap therebetween. It should be noted that the amount of spacing between the segments 30 may be varied based on the different pointing directions for adjacent segments 30. It also should be noted that the shielding members 68 may be formed from any type of collimator or photon blocking material, such as lead or tungsten. Alternatively, radiation leaks may be reduced or prevented by applying a material with a high stopping power such as an epoxy mixed with lead or tungsten powder.

Additionally, different varying pointing direction configurations may be provided. For example, a first pointing direction of one of the segments 30 may be greater than a second pointing direction of another one of the segments 30 such that the segments 30 having the greater pointing directions are located closer to ends or an edge 76 of the body of the collimator 28. Thus, a converging fanbeam collimator may be provided. However, other configurations may be provided by changing the pointing directions, such as to form a diverging fanbeam collimator.

Thus, a single collimator 28 is formed from a plurality of parallel bore segments 30 and that may be coupled to one or more detectors 22 (shown in FIG. 1). In one embodiment, the orientation of the bores 50 is rotated about an axis parallel to the short axis of the collimator 28.

In operation, the detector 22 (or detectors 22) with the collimator 28 coupled or mounted thereto move around the patient 26 (both shown in FIG. 1). Additionally, the detectors 22 may be tilted to provide a level of adjustment as described in more detail herein.

Image data may be acquired at a plurality of angular increments of the detector 22 about the patient 26. It should be noted that the positioning of the detector(s) 22 can be automatic based on prior information (e.g., CT information), emission information (adapting during the scan), atlas-based information (e.g., all hearts are roughly in a particular location), user interaction (e.g., based on initial emission data, a user may select a desired ROI), information based on the reconstructed image (another form of adaptive acquisition and reconstruction), among other information or factors. Additionally, suitable proximity sensors or other means for measuring a patient outline or detecting a patient may be provided.

The segments 30 of the collimator 28 define different focused fields-of-view (FOVs) 72 as shown in FIG. 6. It should be noted that one or more of the segments 30 may have an overlapping portion 74 of the FOVs 72, such as adjacent segments 30. The detector 22 (shown in FIG. 1) is positioned to focus the FOVs 72 on an ROI. Thus, the bores 50 in different ones of the fixed segments 30 may be pointed differently such that each set of bores 50 corresponding to different segments 30 are focused onto the ROI from different pointing directions. It should be noted that at least two sets of the different segments 30 (e.g., segments 30a and 30e, and 30b and 30d) may be tilted the same amount.

Figure 7:
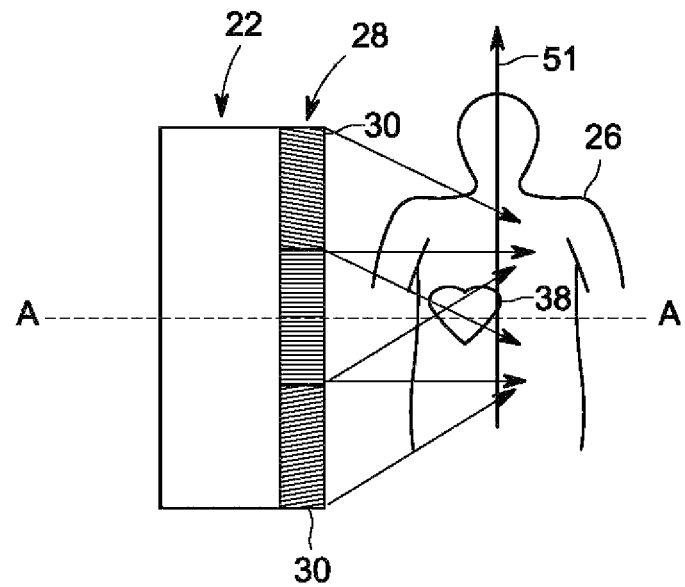
FIG. 7 is a diagram illustrating a cross-sectional view in the transverse plane of a symmetric multi-section collimator for cardiac imaging in accordance with various embodiments.

The detector 22 with collimator 28 may be provided in different configurations. For example, FIG. 7 is a diagram illustrating a cross-sectional view in the transverse plane (also referred to as the horizontal plane, axial plane or transaxial plane, which is perpendicular to the coronal and sagittal planes) of a symmetric multi-section collimator 28 formed in accordance with various embodiments that may be used for cardiac imaging. The detector 22 rotates about a detector rotation axis 51.

In one embodiment, the detector 22 is a general purpose gamma camera having dimensions of, for example, 50 cm by 40 cm (trans-axial and axial dimensions respective to the axis of gantry rotation). In contrast, the human heart 38 is much smaller (less than 20×20×20 cm). Thus, most of the detector 22 is not viewing the heart and is "wasted". Using the segments 30, a greater area of the detector 22 is viewing the heart 38 (or other organ of interest), thus contributing to the useful image data, increasing image quality, reducing imaging time, and/or enabling reduction of injected isotope dose (thereby reducing patient radiation exposure and mutagenic risk to the patient and operator).

Figure 8:
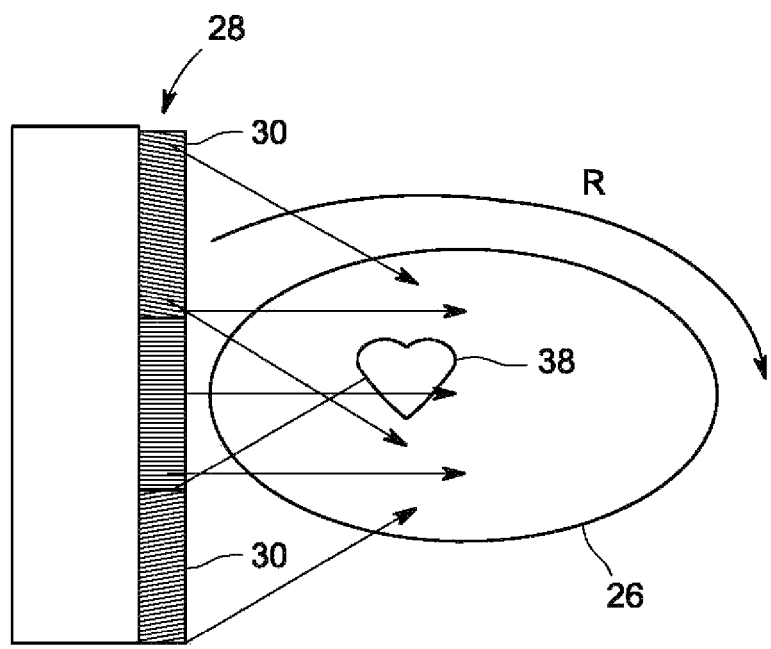
FIG. 8 is a diagram illustrating a coronal plane cross-section of a symmetric multi-section collimator for cardiac imaging in accordance with various embodiments.

FIG. 8 is a diagram illustrating a coronal plane cross-section of the symmetric multi-section collimator 28 (taken along the line A-A in FIG. 7) that may be used for cardiac imaging in accordance with various embodiments. The detector 22 rotates about the patient 26 along the radius R and about the detector rotation axis 51.

Figure 9:
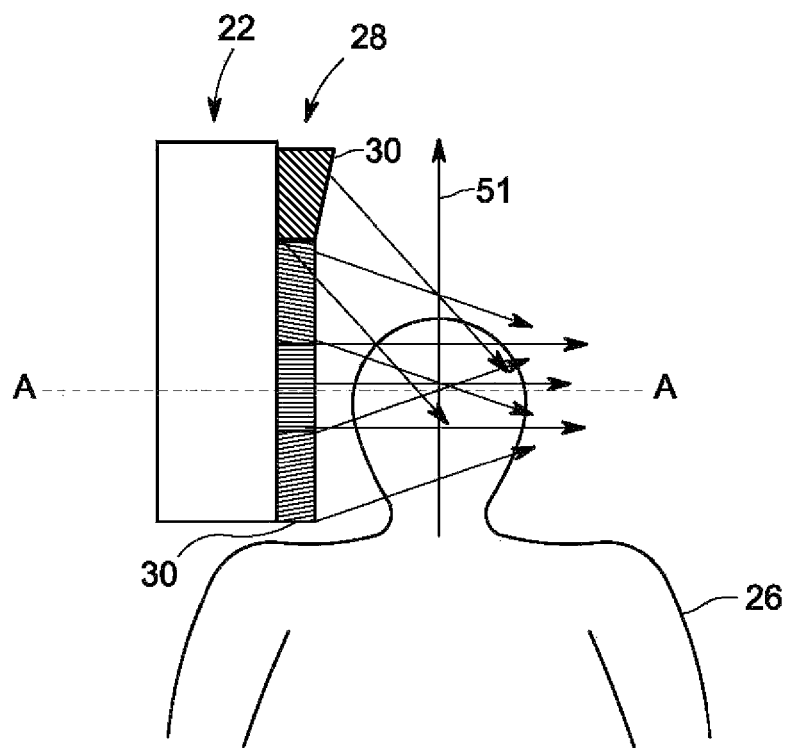
FIG. 9 is a diagram illustrating a transverse plane cross-section of an asymmetric multi-section collimator for brain imaging in accordance with various embodiments.

FIG. 9 is a diagram illustrating of a transverse plane cross-section of an asymmetric multi-section collimator 28 that may be used for brain imaging in accordance with various embodiments. In brain imaging, the patient's shoulders require asymmetric placement of the detector(s) 22 in order to achieve close proximity of the face of the collimator 28 to the imaged organ (as resolution degrades with distance). The asymmetric collimator construction illustrated may provide, for example, for efficient utilization of the detector surface. In one embodiment, as illustrated, collimator segments 30 that are further from the brain optionally may be made with longer bores 50 (which may vary in length) to maintain a similar resolution even with the larger detector-patient distance.

Figure 10:
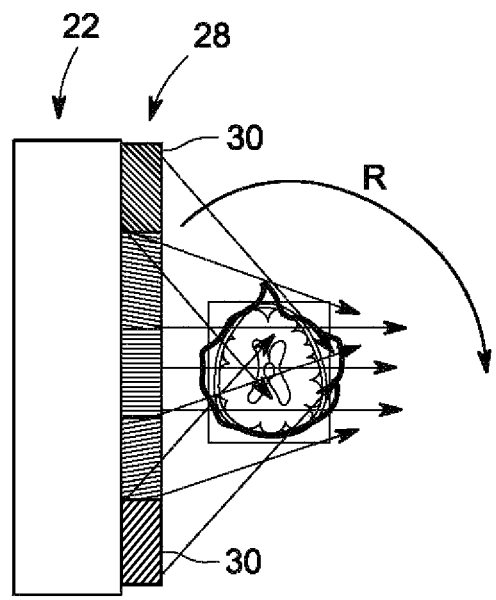
FIG. 10 is a diagram illustrating a coronal plane cross-section of an asymmetric multi-section collimator for brain imaging in accordance with various embodiments.

FIG. 10 is a diagram illustrating a coronal plane cross-section of the asymmetric multi-section collimator 28 (taken along the line A-A in FIG. 9) that may be used for brain imaging in accordance with various embodiments. The detector 22 rotates about the patient 26 along the radius R and about the detector rotation axis 51

Figure 11:
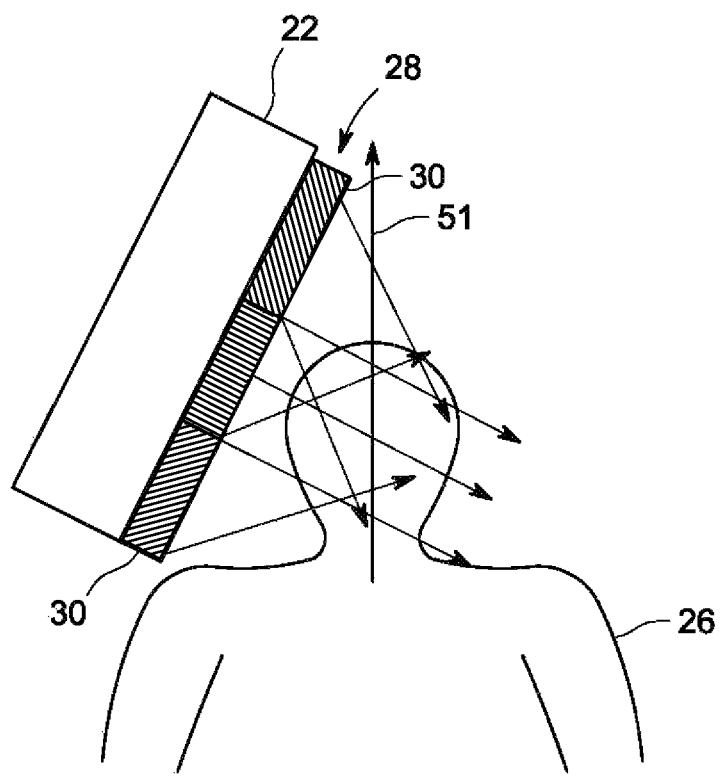
FIG. 11 is a diagram illustrating tilting operation of a detector in accordance with various embodiments.

Additionally, the detector 22 may be moved or tilted to focus on the ROI. For example, as shown in FIG. 11, the entire detector 22 may be tilted at an angle. The detector 22 is tilted, for example, relative to an axis of rotation such that a different portion of the ROI (e.g., a head of the patient 26) may be imaged and not just the center of rotation. The detector 22 may be tilted using any suitable drive mechanism. The detector 22 also may rotate around a gantry (not shown) and about the ROI.

The tilting shown in FIG. 11 puts the "focus" of the collimator 28 on the brain and allows the collimator surface to be positioned close to the head, which would not be possible due to the collision of the collimator 28 with the shoulders of the patient. In one embodiment, in order to avoid collision with the shoulders, the detector 22 rotates at a much greater radius around the head. In this embodiment, a collimator 28 with longer "focal length" is used (in this case, the "focal length" is approximately equal to the radius of rotation). It should be noted that resolution degrades with distance as the sensitivity of a fan beam reduces with the "numerical aperture" of the collimator (defined as the width of the collimator divide by its focal length). Thus, with the tilting, a wide collimator 28 with strongly angulated segments 30 that are pointed at the brain, to a short distance from the brain, without colliding with the shoulders of the patient, is provided.

It should be noted the one movement is not exclusive of other movements. Accordingly, one or more of the movements described herein may be performed simultaneously, concurrently, consecutively, or otherwise, such as rotation about the patient 26 and tilting of the detector 22.

It should be noted that although an odd number of segments 30 are illustrated, namely five, a different number, such as an even number of segments 30 may form the collimator 28. Thus although, five segments 30a-e may be provided as shown in FIG. 6, with the center segment 30c having no slant (with perpendicular bores 50), and the outer segments 30a, 30b, 30d and 30e have bores 50 that are pointed as described herein, the center segment 30c may be removed resulting in a collimator 28 formed from four segments 30. For example, in one embodiment, an asymmetric collimator as described herein may be provided in which an untilted segment 30 (being perpendicular to a face of the collimator 28) is not the central segment 30 of the collimator 28, which may be used, for example, in cardiac imaging. The collimator 28 may have bores 50 with segments 30 having pointing directions defined by the following angles (in degrees): −10, 0, +10, +20.

In operation, prior to acquiring or during acquisition of an image of a structure of interest, the detector(s) 22 may be adjusted, such as the orientation, positioning and/or placement of the detector 22 relative to a structure or object of interest. Additionally, a patient table or gantry also may be moved. With the collimator 28 with fixed segments 30, the patient table may be moved during acquisition such that an object of interest is adequately or sufficiently imaged. Image data is then acquired by each the detector(s) 22, which may be combined and reconstructed into a composite image that may comprise two-dimensional (2D) images, a three-dimensional (3D) volume or a 3D volume over time (4D).

Thus, the detector(s) 22 may be moved to also adjust the effective field of view for one or more of the detectors 22, such that the FOV is reoriented or decreased/increased, such as by pivoting one or more of the detectors 22 and or translating one or more of the detectors 22. It should be noted that in some embodiments cone beam collimation may be provided with the acquired data reconstructed using a suitable iterative reconstruction technique.

Figure 12:
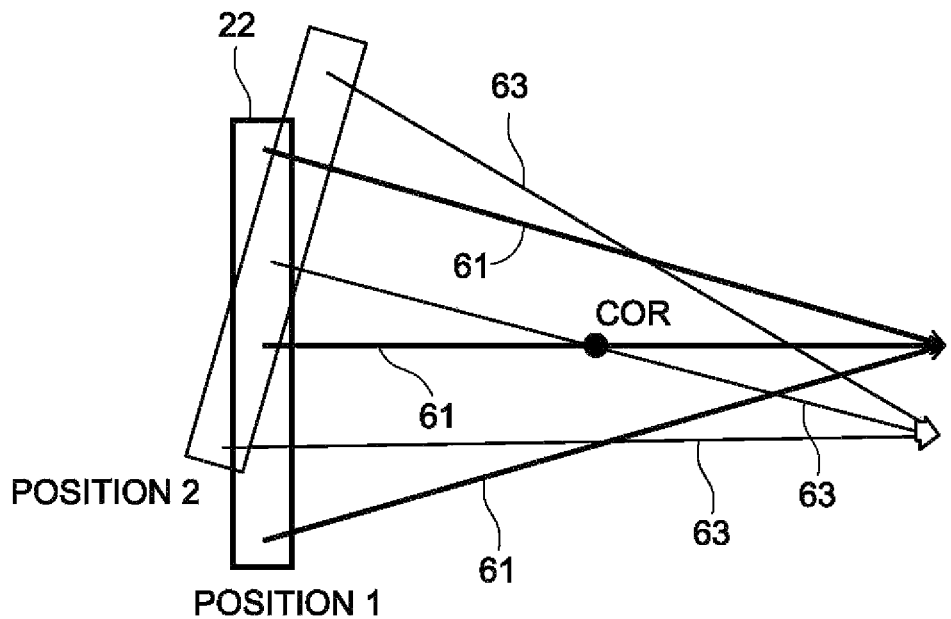
FIG. 12 is a diagram illustrating gantry rotation steps.

In some embodiments, fanbeam type operation, which may be used for approximate fanbeam rebinning may be provided. For example, in one embodiment, the angular increments of the fanbeam are equal to the rotation steps $S_1, S_2, S_3 \ldots S_N$ (or multiples or fractions thereof) of a gantry as shown in FIG. 12. In this embodiment, with the angular increments of the fan-beam equal to the rotation steps of the gantry (namely rotational movements of the gantry), subsequent segments 30 of the collimator 28 are parallel in subsequent views and are rebinned into single parallel projections (which simplifies the reconstruction algorithm). For example, a plurality of bins may be provided wherein each of the bins represents a different location along the gantry and is used to reconstruct an image based on the different views. The data in the bins are time stamped to allow for rebinning into the single parallel projections used to reconstruct an image.

It should be noted that in various embodiments a difference between pointing directions of the various segments 30 may be the same as a gantry rotation step, an integer multiple thereof or a sub-multiple thereof. For example, in various embodiments, for α angle increments and β rotation steps, Mα=Nβ for some integer values of M and N.

Thus, in one embodiment, the detectors 22 with the collimators 28 are rotated about a center of rotation (as defined by the detector rotation axis 51) such that the step size is defined so that the segments 30 of the collimator 28 end up pointing in the same direction in successive views (or after an integer number of steps). For example, as illustrated in FIG. 12, a first step is illustrated by the detector 22 in position 1 with views 61 then the detector 22 is moved to position 2 providing detector views 63.

Thus in operation, a segmented collimator 28 may produce three differently oriented projections at orientations φ1; φ2; φ3 at the same time. When the detector is rotated, for example by an angle α, three more projections are produced: φ1+α; φ2+α; φ3+α. After another rotation by angle α, three more projections are produced: φ1+2α; φ2+2α; φ3+2α, etc. Optionally, some of the orientations may be the same (for example if φ1=n*α; where n is a non-zero integer), these projections may be grouped and combined. The combining may be performed, for example, by summing or performing weighted summation of the acquired data.

It should be noted that this is the case for the tangential angulations of the segments 30. In a collimator 28 where the segments 30 are axially angulated, the rotation of the gantry does not produce overlapping of the segments 30 having different pointing directions (e.g., axially angled). In this case, the data set is composed of projections characterized by d(X,Y,φ,γ) wherein γ is the axial angulations. For example in the embodiment of FIG. 7, γ can be γ1; γ2=0; and γ3=−γ1. Assuming that the angulations of the segments 30 seen in FIG. 8 are φ1=30°; φ2=0°; and φ3=−30°, and the gantry rotation step is α=3°, the following results:
1. Only one of the data of the axially central sections can be combined (γ2=0);
2. after 10 rotation steps (10α=30°) section three assumes the orientation of 10α+φ3=0° to have the same initial orientation of the central section, (γ=0; θ=0)

Figure 13:
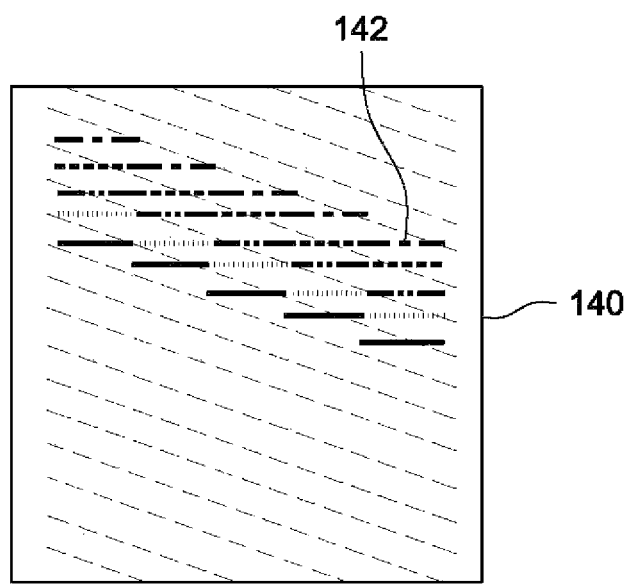
FIG. 13 is a diagram of a sinogram illustrating a sampling scheme for rebinning in accordance with various embodiments.
Figure 14:
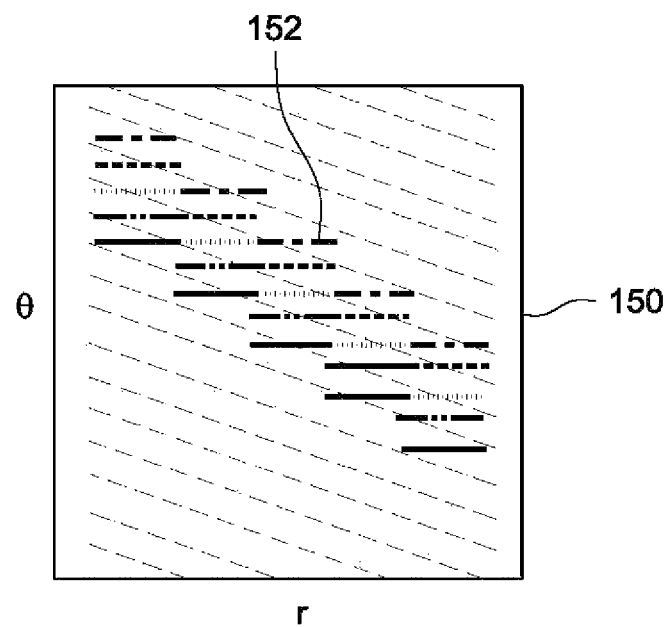
FIG. 14 is a diagram of another sinogram illustrating a sampling scheme in accordance with various embodiments.

In various embodiments, as shown in FIGS. 13 and 14, a sinogram 140 or 150, respectively, is formed that represents responses from the one or more detectors 22, such as radionuclide emissions from the patient 26, wherein θ corresponds to a gantry angle and γ corresponds to emission data. Thus, the sinogram 140 is binned (or sorted) data measured by the detectors 22. FIGS. 13 and 14 illustrate different embodiments of sampling schemes. Using the sinogram 140 or 150, the emission data is then rebinned into parallel projections represented by the aligned data 142 or 152. Accordingly, the acquired data line up over time, which can simplify image reconstruction. It should be noted that the sorted data may generally represent a plurality of projections.

In particular, in the sinogram 140, the gantry motion step is equal to the alignment step of the segments 30 (namely the change in pointing direction). In the sinogram 150 the gantry motion step is half of the alignment step of the segments 30. Thus, while in the sinogram 140, after each gantry step the pointing direction for a segment 30 is the same as the pointing direction of the previous segment 30 in the previous gantry step, in the sinogram 150, the same pointing direction occurs after two steps of the gantry. Thus, a staircase type of collimation is provided wherein each segment 30 "jumps" in pointing direction, which in various embodiments is based on or relative to the gantry steps. It should be noted that each segment 30 may not encompass or "see" the entire FOV (e.g., the organ of interest), such as when the segments 30 are pointed beyond the FOV. After rebinning the data, each projection view will encompass a larger FOV than is seen by an individual segment. In this manner the segmented collimator has a FOV larger than the size of the segments. It should be noted that in some embodiments that use iterative reconstruction, the process of rebinning may not be performed. For example, rebinning in some embodiments is used for rearranging data in a structure fit for a FBP or other direct algorithm.

Figure 15:
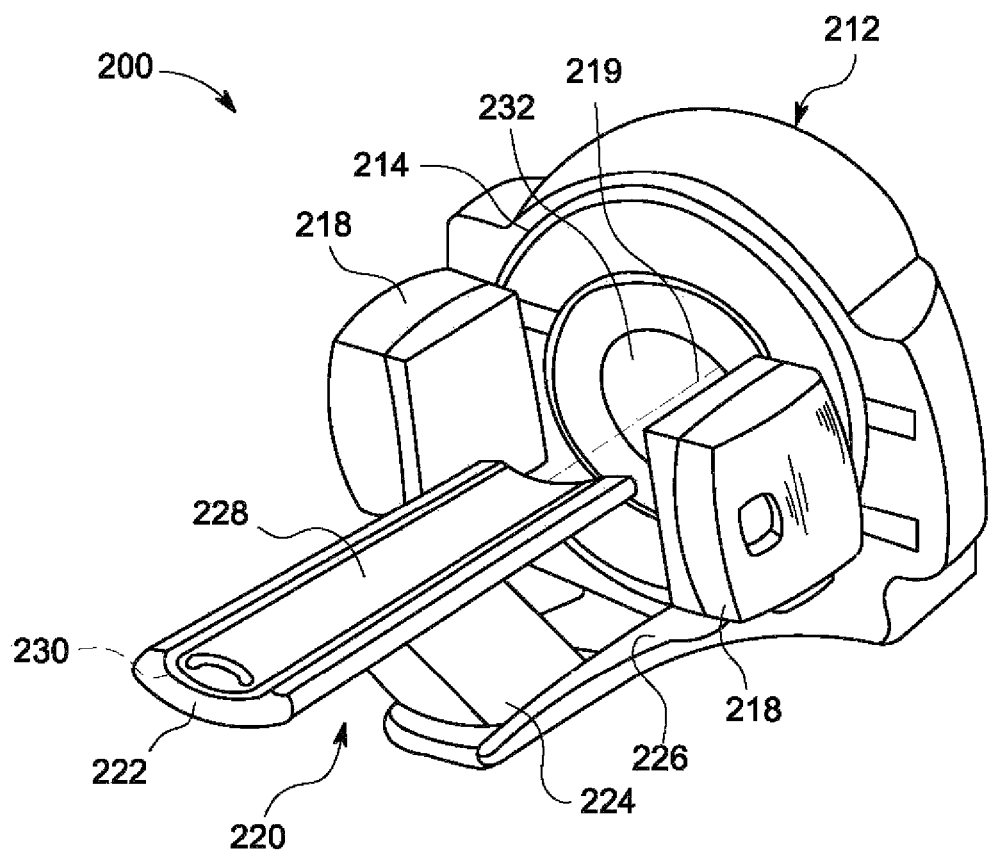
FIG. 15 is a perspective view of an exemplary NM imaging system formed in accordance with various embodiments.

The detectors 22 with collimators 28 of the various embodiments may be provided as part of different types of imaging systems, for example, NM imaging systems such as SPECT imaging systems having different detector configurations. For example, FIG. 15 is a perspective view of an exemplary embodiment of a medical imaging system 200 constructed in accordance with various embodiments, which in this embodiment is a SPECT imaging system. The system 200 includes an integrated gantry 212 that further includes a rotor 214 oriented about a gantry central bore 232. The rotor 214 is configured to support one or more NM cameras 218 (two cameras 218 are shown). The NM cameras 218 may be provided similar to the detectors 22 with the collimators 28. It should be noted that the detectors, for example, the detectors 22 or NM cameras 218 are generally equipped with interchangeable collimators. For example, the detector 22 or NM camera 218 is supplied with a plurality of collimators (or collimator pairs for dual head cameras) wherein each collimator type is used for one type or a few different types of medical imaging procedures. According to some embodiments, fixed-segment collimators are supplied with the detector 22 or NM camera 218 to be used for one or more different imaging applications. The fixed-segment collimators may have segments 30 with different parallel hole pointing directions as described herein, such as based on the type of imaging scan to be performed. In some embodiments, the fixed-segment collimator or collimators are used for applications where more expensive fan-beam or cone beam collimators can be used. In operation, in some embodiments, one of the collimators may be a standard collimator, such as a parallel hole collimator.

In various embodiments, the cameras 218 may be formed from pixelated detectors or a continuous detector material (e.g., NaI:Tl scintillator). The rotors 214 are further configured to rotate axially about an examination axis 219.

A patient table 220 may include a bed 222 slidingly coupled to a bed support system 224, which may be coupled directly to a floor or may be coupled to the gantry 212 through a base 226 coupled to the gantry 212. The bed 222 may include a stretcher 228 slidingly coupled to an upper surface 230 of the bed 222. The patient table 220 is configured to facilitate ingress and egress of a patient (not shown) into an examination position that is substantially aligned with examination axis 219. During an imaging scan, the patient table 220 may be controlled to move the bed 222 and/or stretcher 228 axially into and out of a bore 232. The operation and control of the imaging system 200 may be performed in any suitable manner. It should be noted that the various embodiments may be implemented in connection with imaging systems that include rotating detectors (where a gantry having a stator and a rotor coupled the detectors includes rotation of the stator) or stationary detectors.

Thus, various embodiments provide fanbeam type collimation of detectors using collimators with slanted parallel hole collimator segments.

Figure 16:
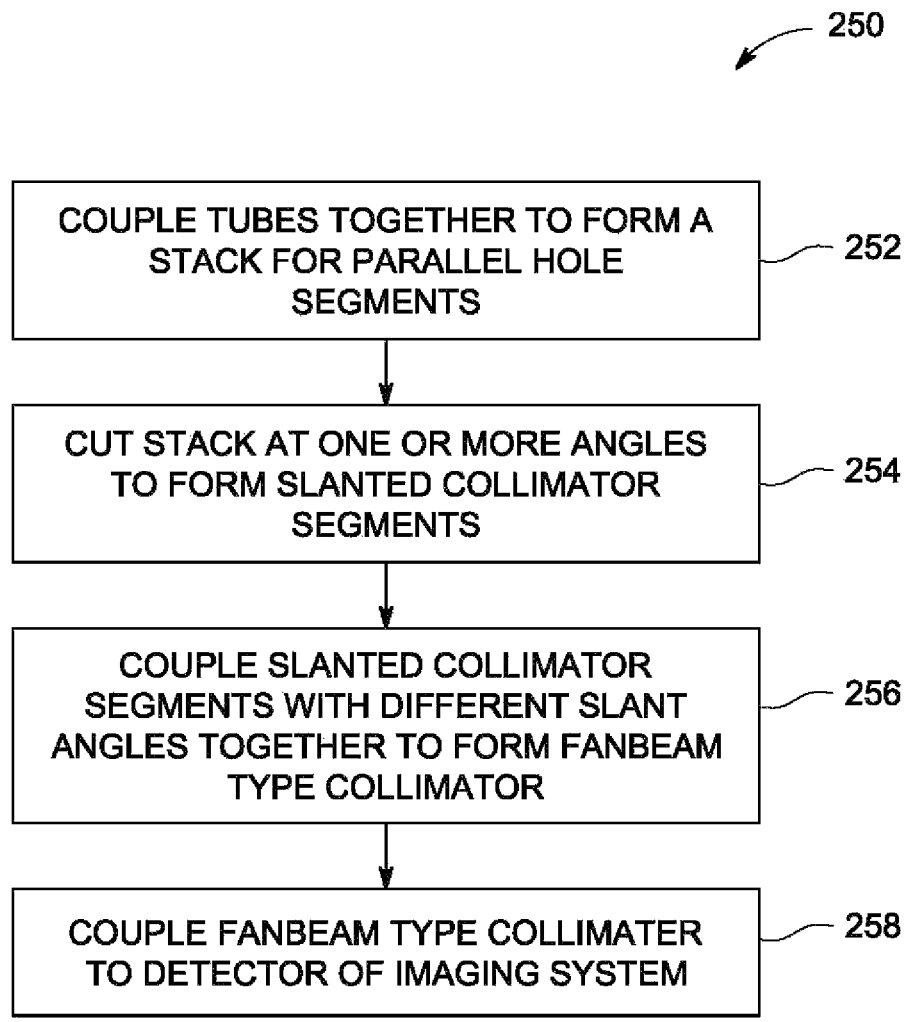
FIG. 16 is a flowchart of a method in accordance with various embodiments for manufacturing a collimator for use in collimating a detector of an imaging system.

Additionally, various embodiments provide a method 250 as illustrated in FIG. 16 for manufacturing a collimator for use in collimating a detector of an imaging system, such as an NM imaging system as described in more detail above. The method 250 includes coupling at 252 a plurality of tubes (with a channel or bore therethrough) together to form a stack for a parallel hole collimator segment. For example, a plurality of tubes formed from collimator suitable material, for example, lead in an NM application, are joined together using a suitable adhesive to form a parallel hole section. Thereafter, the formed stack is cut at one or more pointing directions at 254 as described herein. For example, the stack is cut along one or more non-perpendicular lines relative to the length of the stack. However, it should be noted that in one embodiment, at least one cut is along a line perpendicular to the length of the stack. It also should be noted that the pointing direction for all of the cuts for a single stack may be the same or some may be different.

The cut tubes that form slanted segments are coupled together to form a fanbeam type collimator at 256, such as by joining the segments together with a suitable adhesive. In particular, the slanted segments used to form the collimator include at least two segments having bores slanted at different pointing directions. It should be noted that one of the segments may have non-slanted bores, which may be referred to as bores having a ninety degree or perpendicular slant relative to a front face of the collimator 28. The coupled slanted segments form a fanbeam type collimator wherein different segments provide different collimator focusing. It should be noted that a shield member may be provided in a gap between the joined segments. For example, a filling material may be added between the joined segments to fill in gaps (or partial gaps) between the segments.

Thereafter, the collimator is coupled to an imaging detector of an imaging system at 258. For example, the collimator may be mounted to a front surface of one or more SPECT gamma cameras. With the collimator coupled to the imaging detector, a controller may be used to move the collimated detector to image a particular FOV. The movement may include a defined scan pattern based on prior information such that an optimized scan of a particular organ is performed.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for manufacturing a collimator of an imaging system, the method comprising:
coupling tubes together to form a stack of parallel hole collimator segments or forming a corrugated collimator core;
cutting the stack or the corrugated collimator core at one or more pointing directions to form a plurality of slanted collimator segments in a linear arrangement $S_1$-$S_5$ wherein at least one of the slanted collimator segments has bores cut perpendicular to a face of the stack or the corrugated collimator core to form an untilted segment $S_3$; and
coupling the plurality of slanted collimator segments together to form a segmented type collimator, wherein the untilted collimator segment $S_3$ is positioned central to the collimator, and at least two pairs of the slanted collimator segments $S_2$,$S_4$ and $S_1$,$S_5$ have collimator bores with different pointing directions and pointed inwardly to the same degree so as to arrange a fanbeam collimation configuration throughout the length of the collimator.

2. The method of claim 1, wherein at least one of the pointing directions is ninety degrees relative to a front face of the parallel hole collimator segment.

3. The method of claim 1, wherein the cutting comprises providing the one or more pointing directions at projection pointing direction steps of the imaging system.

4. The method of claim 1, further comprising providing a shielding member in a gap between at least two of the plurality of slanted collimator segments.

5. The method of claim 1, further comprising coupling at least one non-slanted collimator segment together with the plurality of slanted collimator segments wherein the non-slanted collimator segment and the plurality of slanted collimator segments are arranged in a two-dimensional format.

* * * * *